United States Patent [19]
Fukaya et al.

[11] Patent Number: 5,890,749
[45] Date of Patent: Apr. 6, 1999

[54] CONNECTOR FOR CONNECTING PIPE ARRANGEMENTS HAVING SMALL DIAMETER

[75] Inventors: Kazumi Fukaya, Mishima; Hideo Ryuu, Shizuoka Prefecture, both of Japan

[73] Assignee: Usui Kokusai Sangyo Kaisha Limited, Japan

[21] Appl. No.: 972,310

[22] Filed: Nov. 17, 1997

[30] Foreign Application Priority Data

Nov. 20, 1996 [JP] Japan .................................. 8-324619

[51] Int. Cl.⁶ .................................................. F16L 39/00
[52] U.S. Cl. .......................................... 285/319; 285/308
[58] Field of Search .................... 285/319, 310, 285/313, 308, 81, 86

[56] References Cited

U.S. PATENT DOCUMENTS

| | | | |
|---|---|---|---|
| 4,730,856 | 3/1988 | Washizu | 285/319 |
| 4,776,616 | 10/1988 | Umehara et al. | 285/156 |
| 4,895,396 | 1/1990 | Washizu | 285/93 |
| 4,913,467 | 4/1990 | Washizu | 285/39 |
| 4,915,420 | 4/1990 | Washizu | 285/39 |
| 4,944,537 | 7/1990 | Usui et al. | 285/319 |
| 4,946,205 | 8/1990 | Washizu | 285/319 |
| 4,948,180 | 8/1990 | Usui et al. | 285/319 |
| 4,964,658 | 10/1990 | Usui et al. | 285/319 |
| 4,997,216 | 3/1991 | Washizu | 285/319 |
| 5,048,875 | 9/1991 | Usui et al. | 285/319 |
| 5,090,748 | 2/1992 | Usui et al. | 285/319 |
| 5,094,481 | 3/1992 | Takikawa et al. | 285/319 |
| 5,098,136 | 3/1992 | Washizu | 285/319 |
| 5,112,084 | 5/1992 | Washizu | 285/24 |
| 5,114,250 | 5/1992 | Usui | 285/319 |
| 5,127,682 | 7/1992 | Washizu | 285/319 |
| 5,131,687 | 7/1992 | Marchou | 285/23 |
| 5,131,691 | 7/1992 | Washizu | 285/319 |
| 5,141,264 | 8/1992 | Usui | 285/319 |
| 5,154,450 | 10/1992 | Washizu | 285/319 |
| 5,154,451 | 10/1992 | Washizu | 285/319 |
| 5,160,177 | 11/1992 | Washizu | 285/319 |
| 5,163,719 | 11/1992 | Washizu | 285/319 |
| 5,172,940 | 12/1992 | Usui et al. | 285/31 |
| 5,176,412 | 1/1993 | Washizu | 285/319 |
| 5,211,427 | 5/1993 | Washizu | 285/23 |
| 5,324,081 | 6/1994 | Umezawa | 285/56 |
| 5,328,216 | 7/1994 | Miyauchi et al. | 285/319 |
| 5,338,073 | 8/1994 | Washizu et al. | 285/319 |
| 5,354,106 | 10/1994 | Washizu et al. | 285/319 |
| 5,356,183 | 10/1994 | Cole | 285/305 |
| 5,575,512 | 11/1996 | Umezawa | 285/319 |
| 5,580,100 | 12/1996 | Umezawa et al. | 285/39 |

*Primary Examiner*—Brian K. Green
*Assistant Examiner*—Daniel Gambrill
*Attorney, Agent, or Firm*—Anthony J. Casella; Gerald E. Hespos; Ludomir A. Budzyn

[57] ABSTRACT

A connector is provided for a small diameter pipe that has been formed to include an annular swelled part near the end of the pipe. The connector includes a body with a communication hole extending axially therethrough. A chamber extends axially into one end and joins the communication hole. A window is formed through portions of the connector body defining the chamber, and a pawl extends across the window. The pawl includes a central portion that projects into the chamber. The pawl is configured to engage the annular swelled part of the pipe for holding the pipe in the connector body. The connector further includes a releasing member rotatably mounted around the connector body in proximity to the pawl. Outer circumferential portions of the releasing member define a cam wall configured such that rotation of the releasing member into a selected rotational orientation will deflect the pawl outwardly to enable release of the pipe.

5 Claims, 10 Drawing Sheets

CONNECTOR FOR CONNECTING PIPE ARRANGEMENTS HAVING SMALL DIAMETER

BACKGROUND OF THE INVENTION

1. Field of the Invention

The present invention relates to a connector for connecting metal pipes or rigid resin tubes (hereinafter, simply refer to pipe arrangements) having a relatively small diameter of about 20 mm which are generally arranged as a supply passage for oil and air in an automotive vehicle or various kinds of mechanical apparatus.

2. Description of the Prior Art

The connector described in Japanese Patent Application No. 8-121063 which was filed to the Japanese Patent Office on Apr. 18, 1996 by the applicant of this application, is substantially sufficient for many purposes.

The conventional connector has a sleeve member mounted without rotation in clockwise and counterclockwise directions. The sleeve member expands to engage with a tongue-like resilient wall portion communicating to a hook wall provided in the outer peripheral portion thereof. However the rotating position in the expansion wall together with rotation of the sleeve member at a time of connecting the pipe arrangements and releasing them can not be constant. Accordingly, the operation is required to be performed with attention, thereby incurring difficulties. Further, in the case that a large amount of drawing force is applied to the pipe arrangements, there is a possibility that the tongue-like resilient wall may be expanded and opened, so that the further improvement has been required in view of the above points.

SUMMARY OF THE INVENTION

The present invention is made by taking the above described problems into consideration and relates to an improvement thereof. An object of the present invention is to provide a connector for connecting pipe arrangements having a small diameter in which a releasing member rotatably mounted is formed in such a manner as to have a cam wall on a rear end surface and a pair of engaging means for setting and holding a rotational position constant together with rotation thereof. As a result, the positioning of the rotation is constantly performed by the releasing member, a special attention is not required at the operation, the positioning is easily and certainly performed, troublesome at the operation can be removed, the tongue-like resilient wall portion is prevented from being expanded and opened at a time of connecting, and a proper connecting state can be recognized by viewing.

In order to solve the above object, in accordance with the present invention, there is provided a connector for connecting pipe arrangements having a small diameter comprising a connector body provided in such a manner as to extend through a small diameter chamber and a large diameter chamber which are enlarged within a shaft core in such a manner as to communicate with a communicating hole of a connecting cylindrical wall disposed in a front end. The connector body has a seal ring member and a bush member provided within the small diameter chamber of the connector body. A window is pierced on an opposing portion forming a peripheral side of the large diameter chamber. A tongue-like resilient pawl is provided in the notched window groove portion in such a manner as to project forward, has a hook wall with a bent portion inwardly inclined near a center portion or middle part thereof and urged inwardly, and a projecting portion provided in an outer peripheral side of the body near the front end of the window, thereby engaging pressure with an annular expanded wall of the pipe arrangements connected by the middle part or A hook wall cylindrical releasing member engaged with the projecting portion so as to be rotatable in clockwise and counterclockwise directions is provided in the outer side of the peripheral wall of the small diameter chamber. The releasing member is provided with a pair of locking means having a cam wall on a surface in the rear end thereof and for setting a rotational position constant together with the rotation of the releasing member at a time of connecting and releasing the pipe arrangements in a relative opposing surface to the resilient wall or the outer peripheral surface of the connector body, thereby expanding or closing the resilient wall and engaging pressure or releasing by the hook wall portion or middle part of the pawl.

Further, in accordance with the invention, the locking means may be structured by a pair of unevenness portions engaging with each other and provided in the inner peripheral surface of the releasing member and the outer peripheral surface of the connector body. Alternatively parallel surfaces provided in the large and small diameter portions formed by the cam wall in such a manner as to oppose each other and a resilient wall portion engaging the parallel surface to each other. As a further alternate a pair of unevenness portions may engage with each other and may be provided in the large and small diameter portions formed by the resilient wall and the cam wall in such a manner as to oppose each other. Still further a stopper step portion may be provided in both end portions of the cam wall in such a manner as to oppose the outer peripheral surface formed by the cam wall in the radial direction and a resilient wall engaging with the stopper wall in the side surface thereof. Further, in accordance with the invention, the releasing member is structured in such a manner as to be freely rotated and be freely moved in an axial direction, and a notch capable of fitting the tongue-like resilient pawl is formed in the rear end of the releasing member and a resilient tongue portion capable of engaging with the projecting portion is formed in the front end thereof.

Since the invention is structured as above, the relative engagement between the pair of unevenness portions or between the parallel surfaces provided in the cam wall or between the unevenness portions or the stopper step portions provided in the resilient wall and the cam wall is performed together with the rotation by means of the cam wall of the releasing member and the pair of engaging means. Accordingly, the positioning of the releasing member at a time of rotation can be constantly performed with no special attention and with ease and certainty, whereby the difficulties in operation can be removed. Further, in addition that the releasing member is structured in such a manner as to be freely rotated, since the releasing member is structured in such a manner as to be freely moved in the axial direction so as to fit the tongue-like resilient pawl to the notch provided in the rear end of the releasing member at a time of connecting, the resilient member is prevented from being enlarged and opened, thereby preventing the pipe arrangements from coming out and recognizing a proper connecting state by viewing.

BRIEF DESCRIPTION OF THE DRAWINGS

FIGS. 1A and 1B are schematic views which show a pipe arrangements connecting state of a connector for connecting pipe arrangements having a small diameter in accordance with an embodiment of the present invention, in which

FIGS. 27A and 27B are schematic views which only show the releasing member of FIG. 23, in which FIGS. 28A and 28B are schematic views which show another embodiment of the releasing member of FIG. 23, in which

DETAILED DESCRIPTION OF THE PREFERRED EMBODIMENTS

An embodiment in accordance with the present invention will be explained below with reference to FIGS. 1 to 28.

In FIGS. 1 to 22, reference numeral 1 denotes a connector body made of synthetic resin, which has a small diameter chamber 3' provided within a shaft core and enlarged in communicating with a communicating hole 4 of a connecting cylinder wall 2 for inserting a resin tube (not shown) provided in a front end in a projecting manner, and a large diameter chamber 3 provided in a back portion thereof in such a manner as to extend therethrough, and which has a seal ring member 6 and a cylindrical bush member 7 made of rubber material or resin material within a portion of the small diameter chamber.

Further, a hook wall 5 having an inwardly inclined bent portion near the center portion and an inwardly urged tongue-like resilient pawl 1" are provided in a window 1' pierced in an opposing portion formed by a peripheral wall of the large diameter chamber 3 in such a manner as to respectively project forward, and a projecting portion 1''' is integrally provided in an outer peripheral side of the body near the front end of the notched window groove, so that the hook wall portion engages and presses an annular expanded wall P' of a pipe arrangement P connected via the hook wall portion.

Still further, reference numeral 8 denotes a releasing member, which is disposed in the outer portion of the peripheral wall of the small diameter chamber 3' and has a cylindrical shape for engaging the projecting portion 1''' so as to freely rotate in clockwise and counterclockwise direction. The releasing member has a cam wall 8' in a rear end surface, and is structured such that a pair of locking means 9 for setting the rotational position constant by rotation of the pipe arrangement P, particularly of the releasing member at a time of connecting is provided in the opposing peripheral surface with respect to the resilient pawl 1" or the outer peripheral surface of the connector body 1, thereby enlarging and opening the resilient pawl 1".

The structure of the locking means 9 in accordance with the invention is as follows.

(1) As shown in FIGS. 1–8, it is structured such that a pair of interengageable configurations, such as unevenness portions 9' are formed in the inner peripheral surface of the releasing member 8 and the outer peripheral surface of the connector body 1, so that these unevenness portions are engaged with each other.

(2) As shown in FIGS. 9–12, it is structured such that parallel surfaces 9" are provided in a large and small diameter portions formed by the cam wall 8' of the releasing member 8 with opposing to each other so as to engage with the resilient pawl portion 1" to each other.

(3) As shown in FIGS. 13–17, it is structured such that a pair of unevenness portions 9''' are provided in the large and small diameter portions formed by the cam pawl 8' of the releasing member 8 with opposing to each other so as to engage with the resilient pawl portion 1" to each other.

(4) As shown in FIGS. 18–22, it is structured such that a stopper step portions $9_1$ are provided in both end portions of the outer peripheral surface of the cam wall 8' of the releasing member 8 with opposing to each other in the radial direction so as to engage with the side surface of the resilient pawl 1".

Since the locking means 9 mentioned above is provided, the resilient pawl 1" can be enlarged and opened together with the rotation thereof at a time of connecting and releasing the pipe arrangement P by means of the releasing member 8, and at the same time, due to the relative engagement, the rotation can be constantly set so that the positioning can be easily and securely performed.

Next, the other embodiments in accordance with the invention will be described below with reference to FIGS. 23 to 28, and in the embodiments, the same reference numerals are attached to the same elements as those in FIGS. 1 to 22.

These embodiments are provided for the purpose of maintaining the connecting state with preventing the enlargement and open of the tongue-like resilient pawl 1" even when a large amount of drawing force is applied to the pipe arrangement at a time of connecting the pipe arrangement P, and recognizing a proper connecting state by viewing a state of the horizontal position of the tongue-like resilient pawl 1", fitting of the tongue-like resilient pawl to the notch 8" or the position of the annular expanded pawl P', in addition to the structure and effect of the embodiment mentioned above.

In the embodiments shown in FIGS. 23 to 28, the releasing member 8 is freely rotated in clockwise and counterclockwise directions as in the same manner as that of the embodiment mentioned above. However, in the embodiments, the structure is made such that a resilient tongue portion 8''' having a front end which is engaged with the projecting portion 1''' provided on the outer portion of the peripheral pawl of the small diameter chamber 3' but can get over the projecting portion is provided in the front end of the releasing member and that a notch 8" which can fit the front end of the tongue-like resilient pawl 1" is provided in the rear end of the releasing member, so that the releasing member can freely move to the axial direction.

Figure 23:
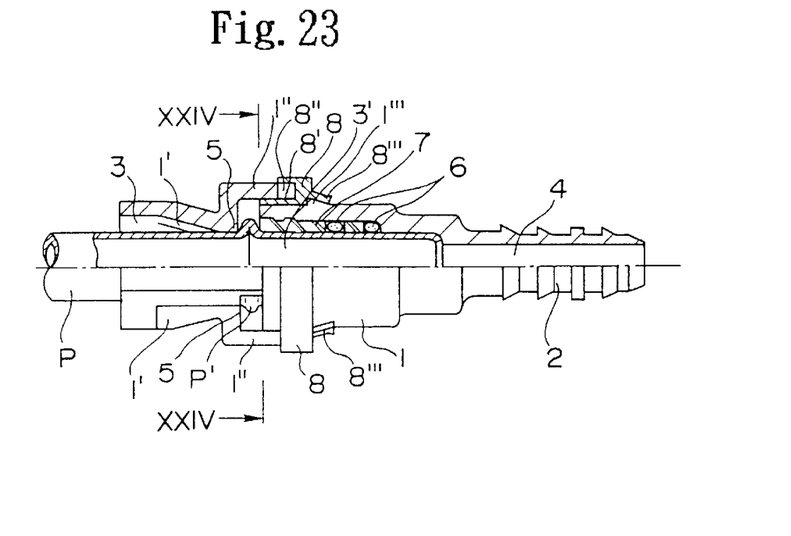
FIG. 23 is a partially broken cross sectional view which shows a pipe arrangement connecting state in accordance with further the other embodiment of the invention.
Figure 24:
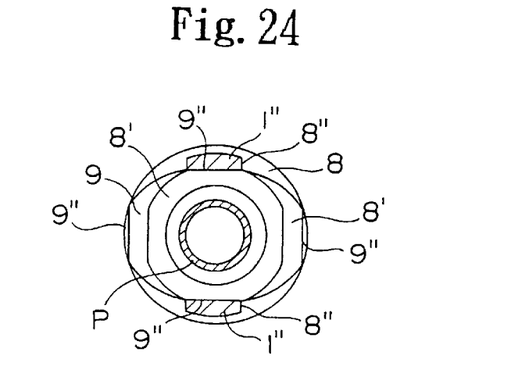
FIG. 24 is a cross sectional view along a line XXIV—XXIV in FIG. 23.
Figure 25:
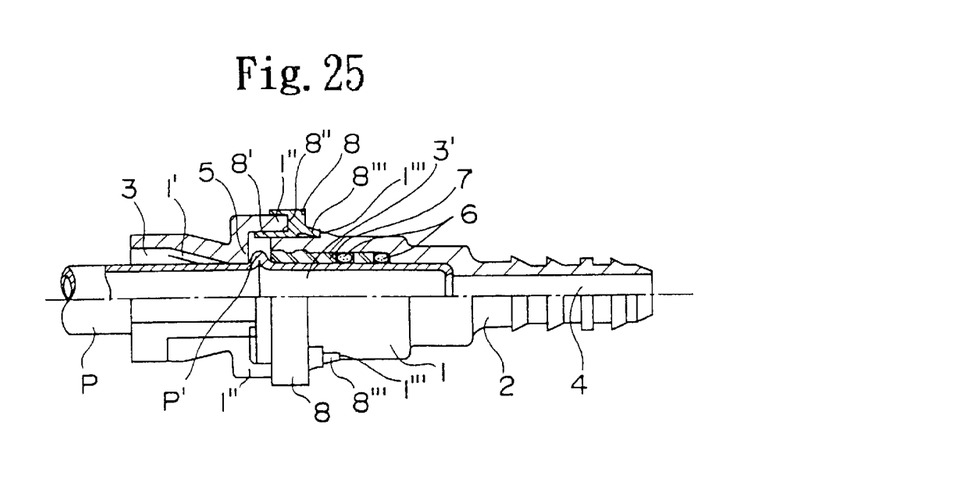
FIG. 25 is a partially broken cross sectional view in a state of pipe arrangement connecting state of the embodiment shown in FIG. 23.
Figure 26:
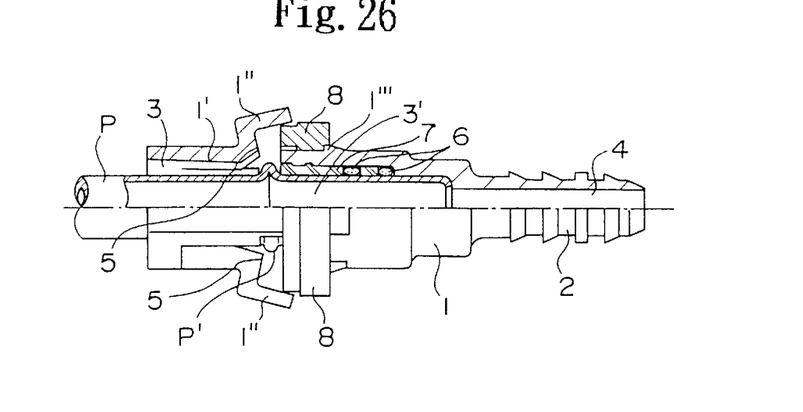
FIG. 26 is a partially broken cross sectional view at a time of releasing the pipe arrangement in accordance with the embodiment shown in FIG. 23.

In this embodiment, when the releasing member 8 is moved rearward in the axial direction from a state immediately after the connecting state as shown in FIG. 23, the resilient tongue portion 8''' gets over the projecting portion 1''' and the front end thereof is engaged with the projecting portion 1''', and further, the front end of the tongue-like resilient pawl 1" is fitted in the notch 8" so as to form the connecting state shown in FIG. 25. By forming this state, the tongue-like resilient pawl 1" is prevented from being enlarged and opened so as to maintain the connecting state and recognize a proper connecting state by viewing.

Next, at a time of releasing the pipe arrangement, at first, the front end of the resilient tongue portion 8''' is moved upward by a nail so as to remove the engagement with the projecting portion 1''', thereby temporarily moving the releasing member 8 to the position shown in FIG. 23, and thereafter, the moving member is rotated in the same manner as that of the embodiment mentioned above. Then, the engagement and pressing between the hook pawl portion 5 and the annular expanded pawl portion P' of the pipe arrangement P is removed (FIG. 26) so that the pipe arrangement P can be released.

Figure 1A:
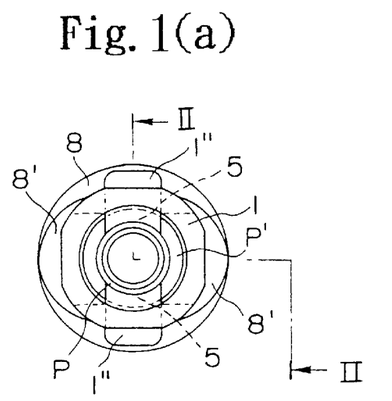
FIG. 1A is a back elevational view and FIG. 1B is a front elevational view.
Figure 1B:
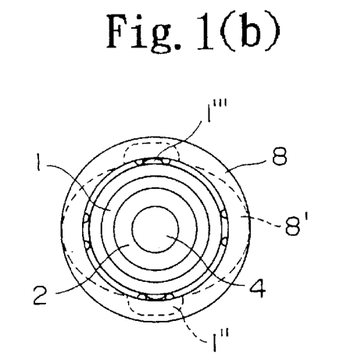
Figure 2:
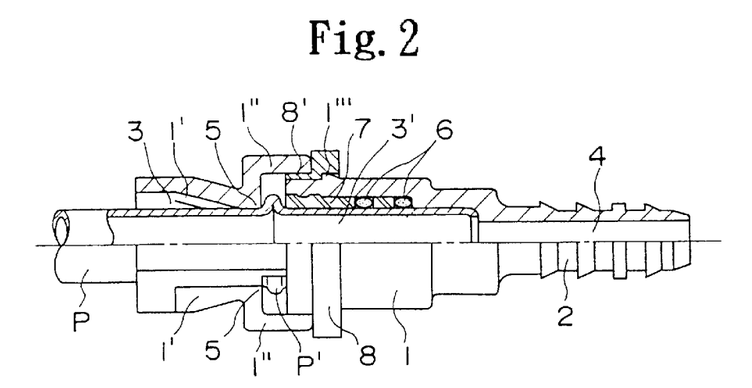
FIG. 2 is a cross sectional view along a line II—II in FIG. 1A.
Figure 3:
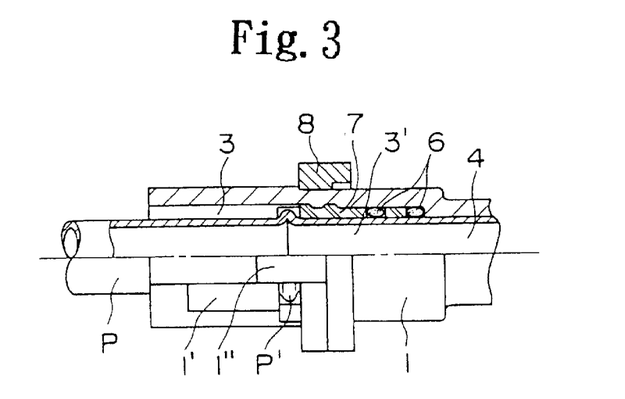
FIG. 3 is a partially broken cross sectional view which shows a position rotating about 90° of FIG. 2.
Figure 4:
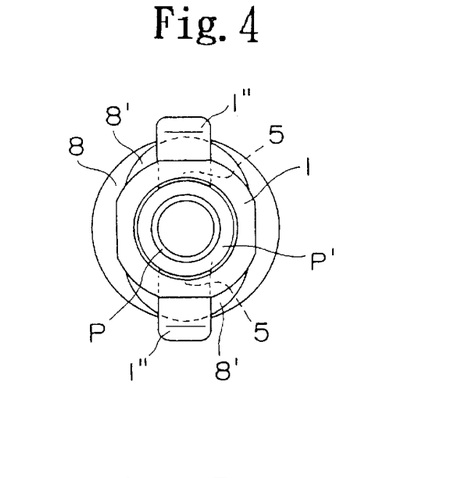
FIG. 4 is a schematic view corresponding to FIG. 1 which shows a pipe arrangement released state.
Figure 5:
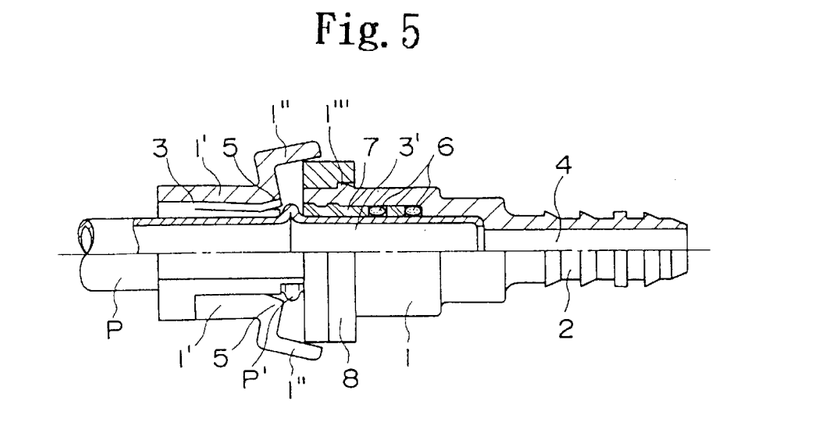
FIG. 5 is a schematic view which shows a partially broken cross section of FIG. 4.
Figure 6:
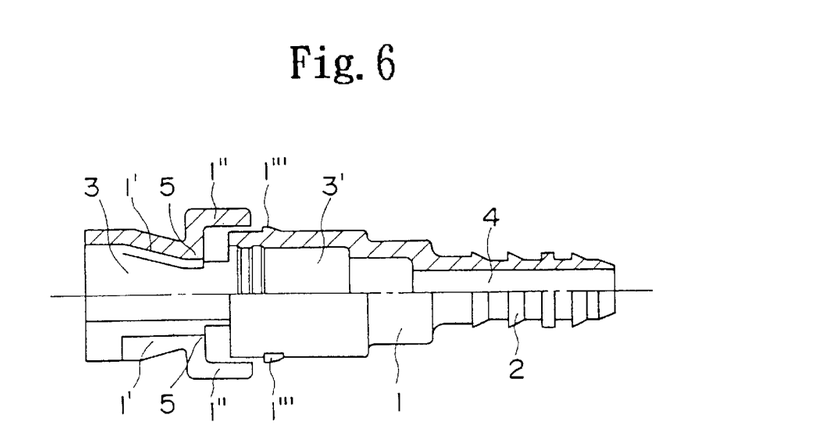
FIG. 6 is a partially broken cross sectional view which only shows a connector body of FIG. 1.
Figure 7:
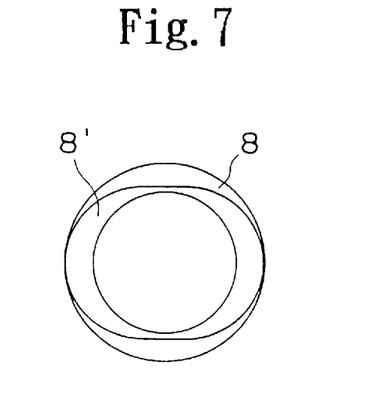
FIG. 7 is a plan view which only shows the releasing member of FIG. 1.
Figure 8:
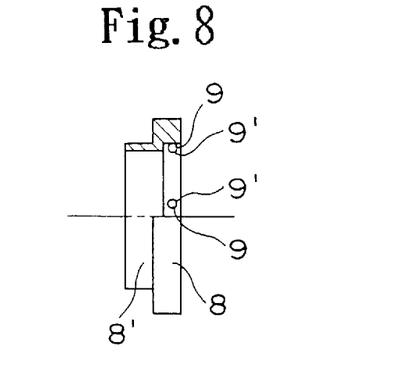
FIG. 8 is a partially broken side elevational view of FIG. 7.
Figure 9:
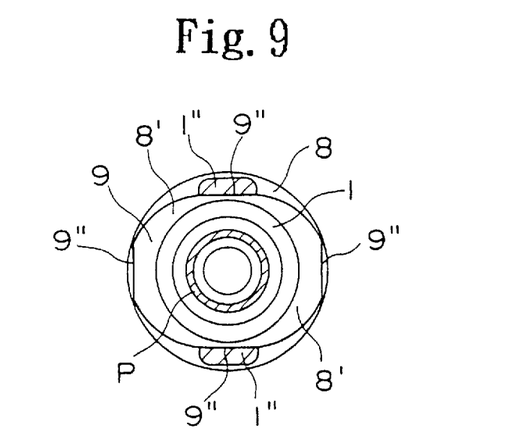
FIG. 9 is a horizontally cross sectional view in a pipe arrangement connecting state in accordance with another embodiment of the invention.
Figure 10:
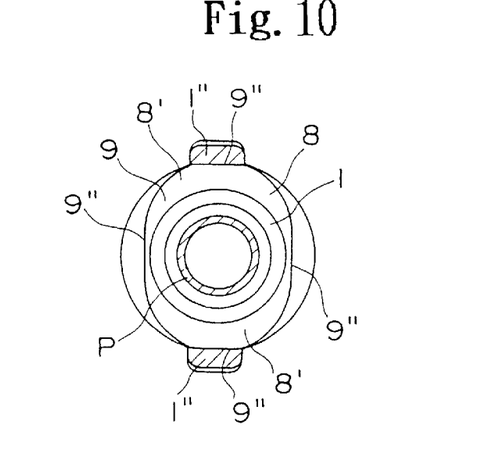
FIG. 10 is a schematic view which shows a pipe arrangement released state of FIG. 9.
Figure 11:
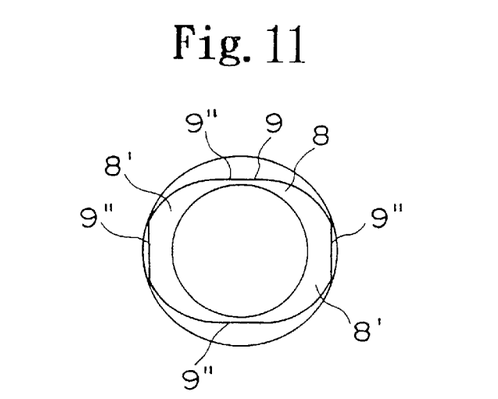
FIG. 11 is a plan view which only shows the releasing member of FIG. 9.
Figure 12:
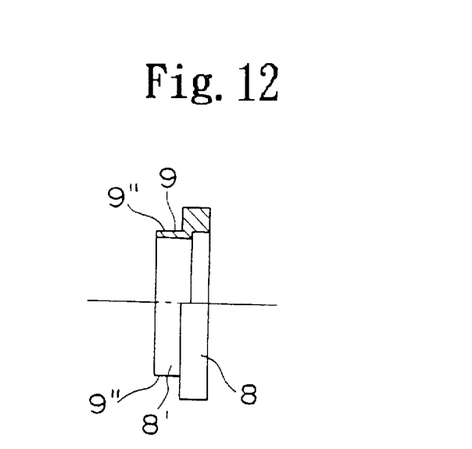
FIG. 12 is a partially broken side elevational view of FIG. 11.
Figure 13:
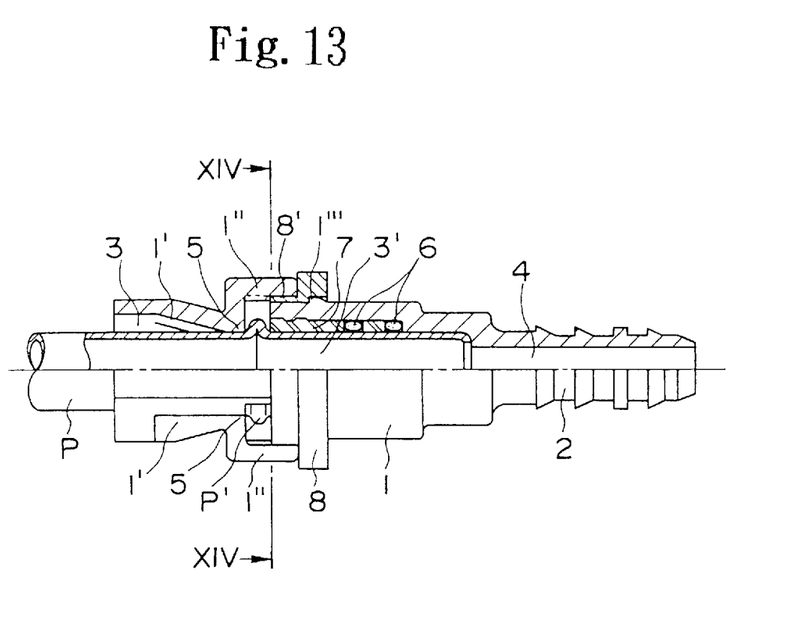
FIG. 13 is a partially broken cross sectional view which shows a pipe arrangement connecting state in accordance with the other embodiment of the invention.
Figure 14:
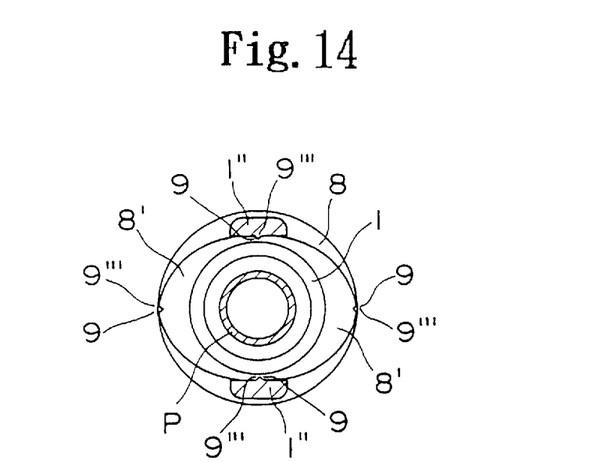
FIG. 14 is a cross sectional view along a line XIV—XIV in FIG. 13.
Figure 15:
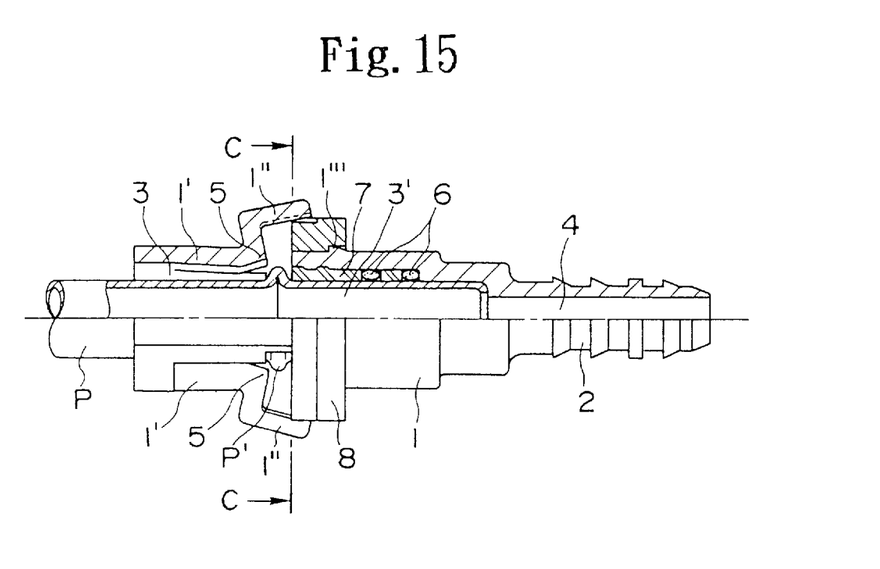
FIG. 15 is a schematic view which shows a pipe arrangement released state of FIG. 13.
Figure 16:
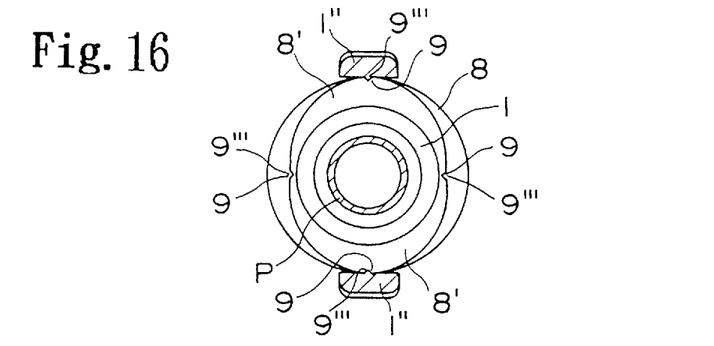
FIG. 16 is a cross sectional view along a line XVI—XVI in FIG. 15.
Figure 17:
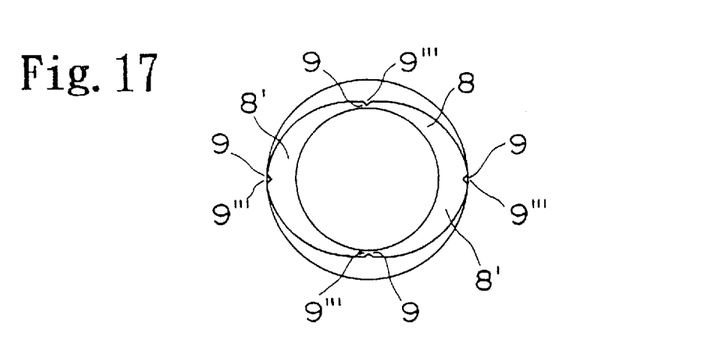
FIG. 17 is a plan view which only shows the releasing member of FIG. 13.
Figure 18:
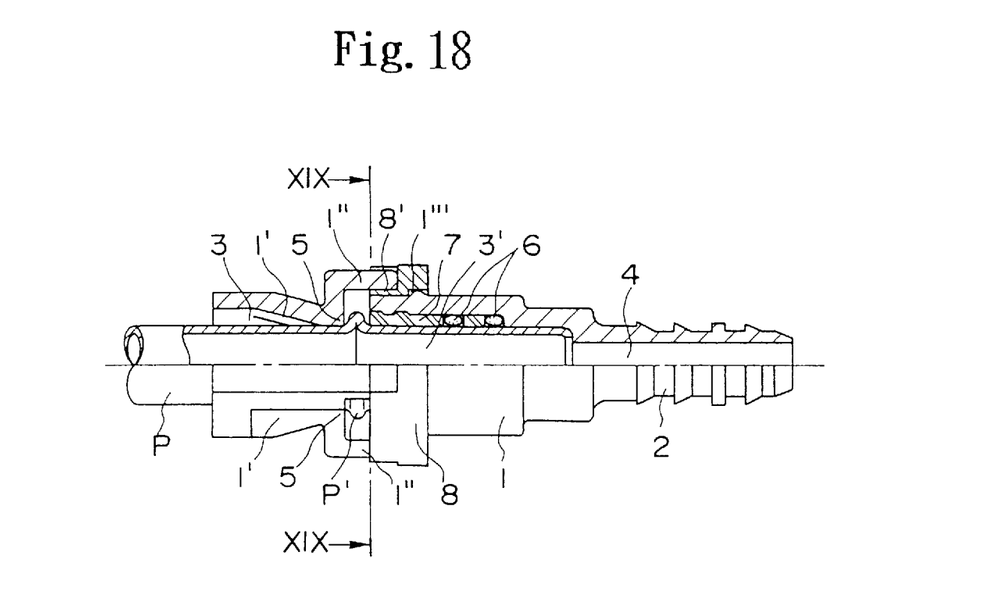
FIG. 18 is a partially broken cross sectional view which shows a pipe arrangement connecting state in accordance with further the other embodiment of the invention.
Figure 19:
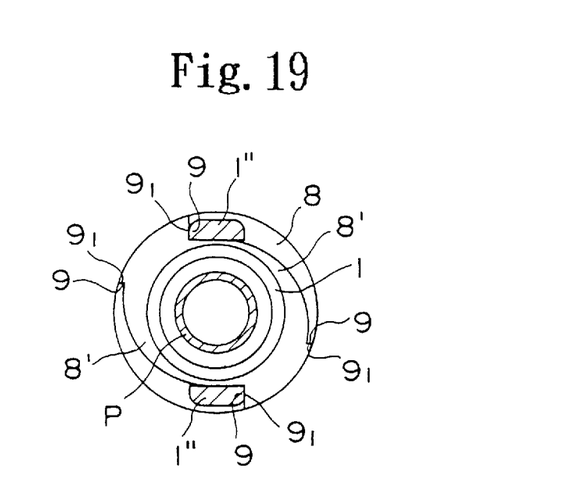
FIG. 19 is a cross sectional view along a line XIX—XIX in FIG. 18.
Figure 20:
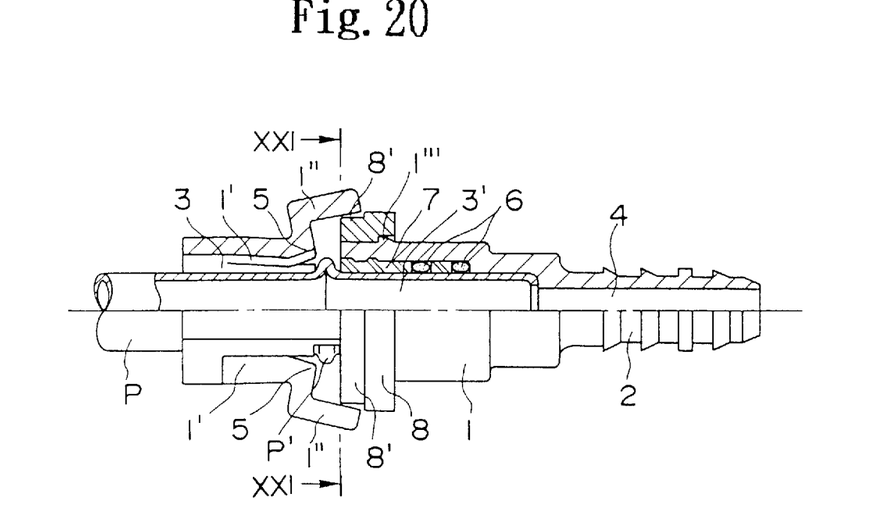
FIG. 20 is a schematic view which shows a pipe arrangement released state of FIG. 18.
Figure 21:
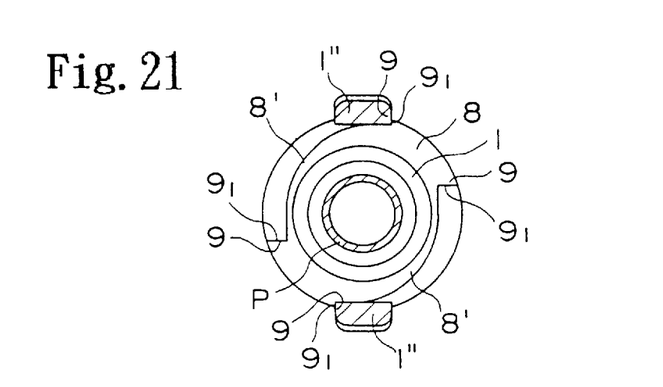
FIG. 21 is a cross sectional view along a line XXI—XXI in FIG. 20.
Figure 22:
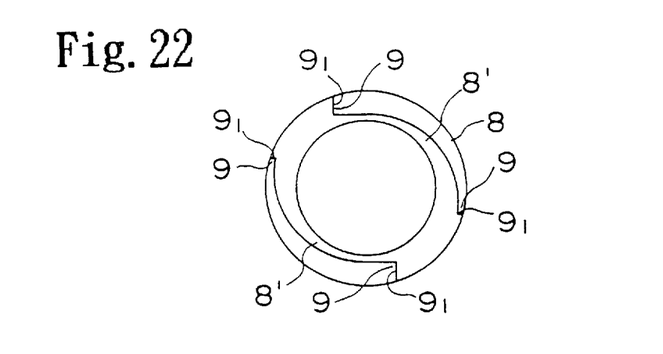
FIG. 22 is a plan view which only shows the releasing member of FIG. 18.
Figure 27A:
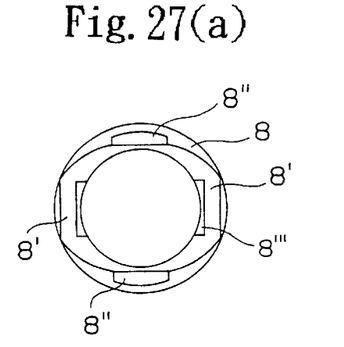
FIG. 27A is a plan view and FIG. 27B is a half sectional view of FIG. 27A.
Figure 27B:
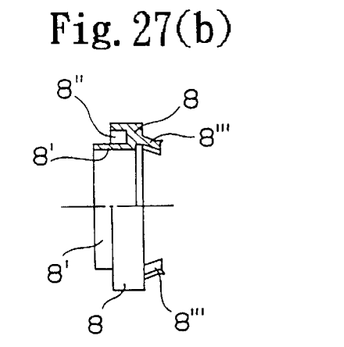
Figure 28A:
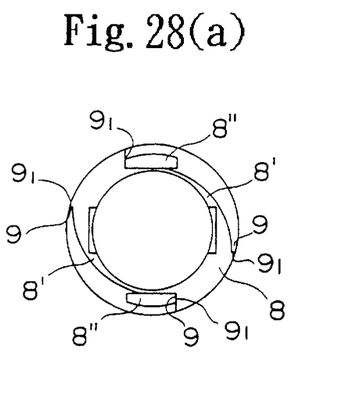
FIG. 28A is a plan view and FIG. 28B is a half sectional view of FIG. 28A.
Figure 28B:
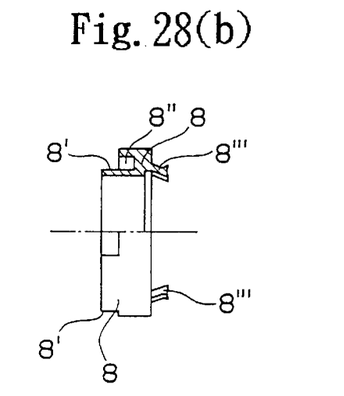

At this time, as the locking means 9 for setting the rotation constant and positioning, the various means mentioned above can be used, however, the embodiment shown in FIG. 27 uses the means described in FIG. 11 and the embodiment shown in FIG. 28 uses the means described in FIG. 21. In this case, reference numeral 8"" in FIG. 27 denotes a notch portion to which the outer wall of the connector body 1 can be fitted. The notch portion 8" engages with the connector body so as to restrict the rearward movement of the releasing member 8.

As mentioned above, since the connector for connecting the pipe arrangements having a small diameter in accordance with the invention is structured such that the releasing member 8 for enlarging and opening the resilient pawl portion 1" together with the rotation thereof at a time of connecting and releasing the pipe arrangement P is formed by providing the cam pawl 8' and the locking means 9, the relative engagement due to the rotation thereof sets the positioning of the rotation constant, so that the positioning can be easily and securely performed with no special attention, thereby removing the difficulties in operation. Further, in addition that the releasing member 8 is structured such as to be freely rotated, since the releasing member 8 is structured such as to be freely moved in the axial direction, thereby fitting the tongue-like resilient pawl 1" to the notch 8" provided in the rear end of the releasing member at a time of connecting, the resilient pawl portion is prevented from being enlarged and opened. Accordingly, the connector for connecting the pipe arrangements having a small diameter which is efficient in preventing the pipe arrangement from being come out and recognizing a proper connecting state by viewing can be provided.

What is claimed is:

1. A connector for a small diameter pipe having an end and an annularly swelled part spaced from said end, said connector comprising:

a connector body having a first end, a second end and a longitudinal axis therebetween, a connecting tubular wall formed at the first end and having a communicating hole extending axially therethrough, a chamber extending axially from the second end of said connector body to the communicating hole through the connecting tubular wall, a window formed through portions of said connector body defining said chamber, at least one pawl projecting across said window and toward said first end of said connector body from a location on said connector body in proximity to said second end, said pawl having a middle part projecting through said window and into said chamber, a leg extending outwardly from said middle part and through said window and an end part extending from said leg and toward said first end of said connector body; and a releasing member rotatably mounted around portions of said connector body between said window and said first end of said connector body for rotation about the longitudinal axis of the connector body, outer circumferential portions of said releasing member defining a cam wall having at least a first section at a minor distance from said longitudinal axis and at least a second section at a major distance from said longitudinal axis, said end part of said pawl being biased against said cam wall, at least one lock formed on at least a selected one of said cam wall and said end part of said pawl for releasably holding said releasing member in a selected rotational position on said connector body, said pawl and said cam wall being dimensioned such that the second section of said cam wall biases said pawl outwardly for enabling the removal and insertion of said pipe into said chamber, and such that the first section of said cam wall permits said pawl to be biased inwardly for lockingly engaging said annularly swelled part of said pipe.

2. The connector of claim 1, wherein the at least one lock is defined by interengageable configurations respectively on the cam wall and on inner surface regions of said member engaged with said cam wall.

3. The connector of claim 1, wherein the at least one pawl comprises a pair of diametrically opposed pawls, and wherein the at least one lock comprises opposed parallel surfaces on said cam wall for releasably engaging inner surface regions of the respective pawls.

4. The connector of claim 1, wherein the lock comprises a stop region formed on the cam wall to define a limit of rotational movement of said releasing member in a first rotational direction and a stop projection on the cam wall at a location rotationally spaced from said stop wall for releasably engaging said pawl between said stop wall and said stop projection.

5. The connector of claim 1, wherein the connector body includes a projecting portion on the outer peripheral surface at a location between said window and said first end, the releasing member being rotatably engaged with said projecting portion.

* * * * *